United States Patent
Arimilli et al.

(10) Patent No.: US 6,763,434 B2
(45) Date of Patent: Jul. 13, 2004

(54) DATA PROCESSING SYSTEM AND METHOD FOR RESOLVING A CONFLICT BETWEEN REQUESTS TO MODIFY A SHARED CACHE LINE

(75) Inventors: Ravi Kumar Arimilli, Austin, TX (US); John Steven Dodson, Pflugerville, TX (US); Guy Lynn Guthrie, Austin, TX (US); Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 09/752,947

(22) Filed: Dec. 30, 2000

(65) Prior Publication Data

US 2002/0129211 A1 Sep. 12, 2002

(51) Int. Cl.$^7$ .............................................. G06F 12/00
(52) U.S. Cl. ....................................... 711/146; 711/145
(58) Field of Search ................................. 711/145, 146, 711/141

(56) References Cited

U.S. PATENT DOCUMENTS

| | | | | |
|---|---|---|---|---|
| 5,551,005 A | * | 8/1996 | Sarangdhar et al. | 711/145 |
| 5,778,437 A | * | 7/1998 | Baylor et al. | 711/141 |
| 6,401,176 B1 | * | 6/2002 | Fadavi-Ardekani et al. | 711/151 |
| 2002/0007444 A1 | * | 1/2002 | Freerksen et al. | 711/146 |

* cited by examiner

*Primary Examiner*—Matthew Kim
*Assistant Examiner*—Shane M Thomas
(74) *Attorney, Agent, or Firm*—Casimer K. Salys; Dillon & Yudell LLP

(57) ABSTRACT

Disclosed herein are a data processing system and method of operating a data processing system that arbitrate between conflicting requests to modify data cached in a shared state and that protect ownership of the cache line granted during such arbitration until modification of the data is complete. The data processing system includes a plurality of agents coupled to an interconnect that supports pipelined transactions. While data associated with a target address are cached at a first agent among the plurality of agents in a shared state, the first agent issues a transaction on the interconnect. In response to snooping the transaction, a second agent provides a snoop response indicating that the second agent has a pending conflicting request and a coherency decision point provides a snoop response granting the first agent ownership of the data. In response to the snoop responses, the first agent is provided with a combined response representing a collective response to the transaction of all of the agents that grants the first agent ownership of the data. In response to the combined response, the first agent is permitted to modify the data.

22 Claims, 5 Drawing Sheets

DATA PROCESSING SYSTEM AND METHOD FOR RESOLVING A CONFLICT BETWEEN REQUESTS TO MODIFY A SHARED CACHE LINE

BACKGROUND OF THE INVENTION

1. Technical Field

The present invention relates in general to data processing and, in particular, to a data processing system and method for resolving conflicts between memory access requests. Still more particularly, the present invention relates to a data processing system and method for resolving conflicts between requests to modify a cache line in a shared state.

2. Description of the Related Art

A typical symmetric multiprocessor (SMP) data processing system architecture includes a system bus coupled to a plurality of agents, at least one of which (e.g., a memory controller) provides an interface through which a system memory can be accessed. In many data processing system implementations, at least one of the agents, for example, a processor, has one or more associated caches for storing data and/or instructions (hereinafter, both referred to as data) associated with system memory addresses at relatively low access latency as compared to the system memory. Thus, data are available for read and write access by the agents from multiple sources (i.e., caches and system memory) having different associated access latencies.

In data processing systems that cache data, proper system operation depends upon the coordination of accesses satisfied by multiple possible data sources to ensure that read and write accesses to each system memory address are ordered such that agents requesting read access receive correct data. To provide the required coordination of data accesses, a cache coherency protocol is employed, which specifies the possible cache states for data and the caching behavior of the agents. In addition, a bus protocol is employed that, inter alia, specifies the transactions agents issue in response to certain internal operations and the snoop responses agents are required to provide in response to snooping transactions on the system bus. Such snoop responses are compiled to produce a combined response indicating what action, if any, one or more agents are to take in response to the transaction.

Traditional implementations of cache coherency protocols, such as the well-known MESI (Modified, Exclusive, Shared, Invalid) protocol, have required an agent to gain exclusive access to data prior to modifying a locally cached copy, for example, by issuing a read-with-intent-to-modify (RWITM) transaction on the system bus. The RWITM transaction requests that the initiating agent be provided an up-to-date copy of a target cache line and that other agents invalidate their copies of the cache line, if any.

To decrease the latency of stores to cache lines that are held non-exclusively (e.g., in the Shared (S) state), some coherency protocol implementations permit an agent to issue a Dclaim transaction on the system bus to inform other agents that it desires to modify its locally cached copy of a target cache line and that other cached copies of the cache target line, if any, should be invalidated. Thus, a Dclaim differs from a RWITM in that an agent issuing a Dclaim is not requesting a copy of the target cache line. The agent issuing the Dclaim transaction can proceed with its store without violating coherency if it receives a combined response to the Dclaim transaction indicating that all other agents have received the transaction and will invalidate any cached copies of the shared cache line.

In data processing systems that support Dclaim transactions, a central issue that must be addressed by the coherency and bus protocols is how to arbitrate between multiple agents that desire to store to a shared cache line within a relatively small time window. In data processing systems in which transactions on the system bus are strictly ordered (i.e., each transaction issued on the system bus receives a combined response representing the collective response of all the agents prior to the next transaction being issued), conflicts between agents desiring to store to a shared cache line are typically resolved in favor of the agent that first gains ownership of the system bus. That is, the first agent to issue a Dclaim transaction on the system bus receives a combined response indicating that the agent can proceed with its store operation and all other agents must invalidate their copies of the cache line, if any. Thus, all other agents desiring to store to the shared cache line must wait until the store operation completes and then issue a RWITM transaction to acquire the modified cache line for subsequent modification.

The present invention recognizes that arbitration between multiple agents desiring to modify a shared cache line is more complex in data processing systems that pipeline bus transactions (i.e., one or more other transactions may be issued on the system bus prior to the agent issuing an earlier transaction receiving a combined response). The additional complexity arises from the fact that a first agent that desires to modify a shared cache line may be required to provide a snoop response to a second agent's Dclaim transaction prior to receiving a combined response to its own Dclaim transaction. However, without receiving the combined response to its own Dclaim transaction, the first agent does not have enough information to indicate in its snoop response whether the second agent's modifying operation can proceed.

The present invention also recognizes that the coherency and system bus protocols must somehow protect the ownership of a shared cache line by an agent that wins ownership of the shared cache line during arbitration. That is, once the coherency protocol has granted ownership of a shared cache line to a first agent for purposes of modification, the coherency protocol cannot permit another agent to gain ownership of the same cache line until the first agent has completed modification of the cache line and all other agents have agreed to invalidate their cached copies of the line, if any.

SUMMARY OF THE INVENTION

In view of the foregoing, the present invention provides a data processing system and method of communication in a data processing system that arbitrate between conflicting requests to modify data cached in a shared state and that protect ownership of the cache line granted during such arbitration.

According to a preferred embodiment of the present invention, a data processing system includes a plurality of agents coupled to an interconnect that supports pipelined transactions. While data associated with a target address are cached at a first agent among the plurality of agents in a shared state, the first agent issues a transaction on the interconnect. In response to snooping the transaction, a second agent provides a snoop response indicating that the second agent has a pending conflicting store request, and a coherency decision point provides a snoop response granting the first agent ownership of the data. In response to the snoop responses, the first agent is provided with a combined response representing a collective response to the transaction of all of the agents that grants the first agent ownership of the data. In response to the combined response, the first agent is permitted to modify the data. To maintain coherency, the first agent also invalidates other cached copies of the data, if any, preferably by issuing on the interconnect one or more kill transactions specifying the target address associated with the data.

Because the first agent is unaware of its ownership of the data until receipt of the combined response, the coherency decision point protects the grant of ownership to the first agent until the combined response is received by the first agent. Following receipt of the combined response, the first agent can assume responsibility for protecting its ownership of the data until modification of the data is complete, other agents acquiesce to invalidation of their cached copies of the data, if any, and no other agent has an intention to modify a locally cached shared copy of the target cache line. The coherency decision point and the first agent preferably protect the first agent's ownership of the data by providing appropriate snoop responses to conflicting transactions, if any.

Additional objects, features, and advantages of the present invention will become apparent from the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
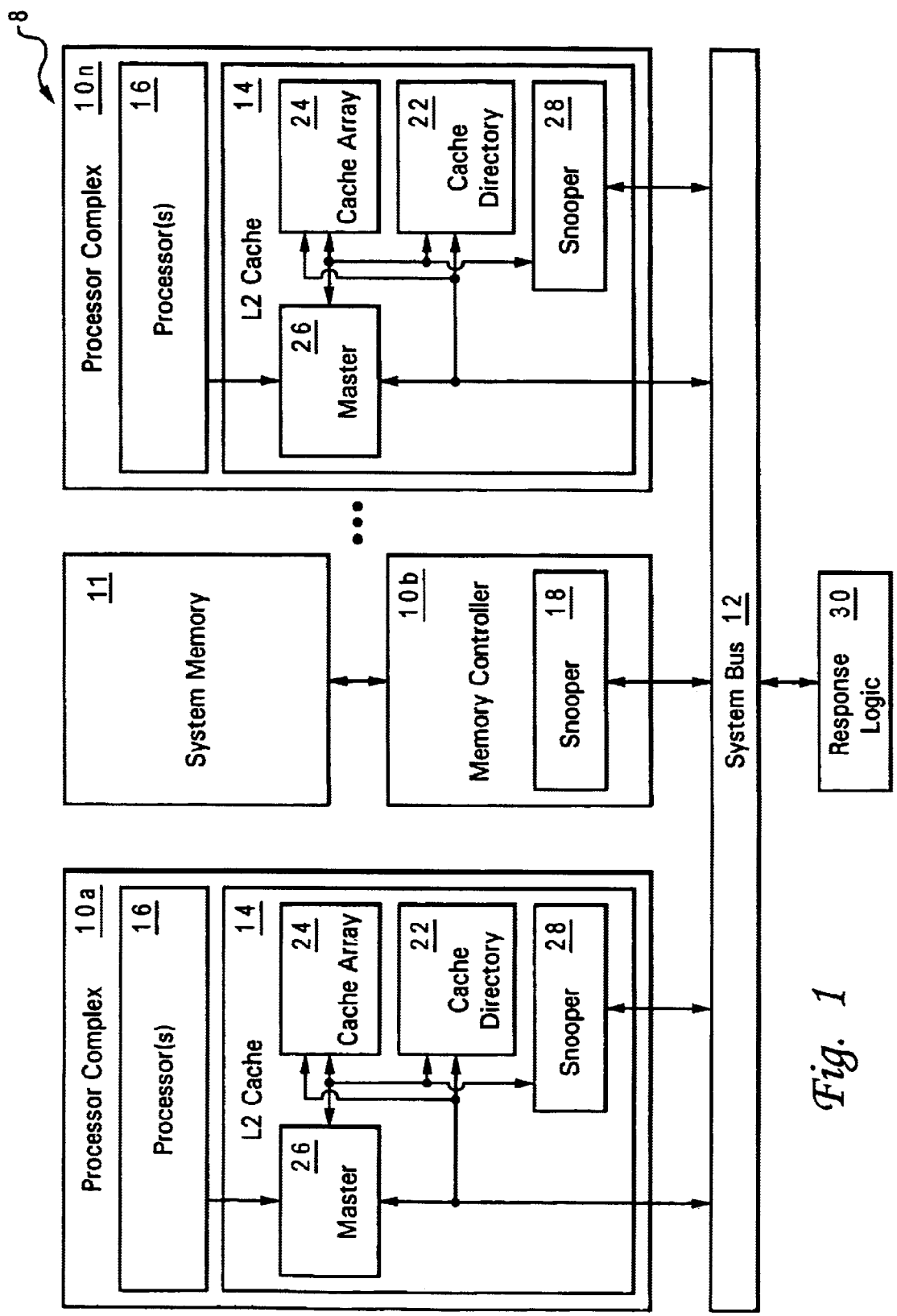
FIG. 1 is a high-level block diagram of a data processing system in accordance with a preferred embodiment of the present invention.

With reference now to the figures and in particular with reference to FIG. 1, there is illustrated a high-level block diagram of an exemplary data processing system 8 in accordance with the present invention. In particular, data processing system 8 of FIG. 1 employs coherency and communication protocols that arbitrate between multiple requests to modify a particular cache line in a shared state and that protect ownership of the shared cache line awarded during arbitration.

Data processing system 8 includes a number of agents 10 coupled to a system bus 12 for communication. Transactions on system bus 12 are pipelined, meaning that one or more transactions may be issued by agents 10 on system bus 12 prior to an earlier transaction receiving a combined response.

Agents 10 include at least one agent (e.g., memory controller 10b) that provides an interface for a system memory 11. Memory controller 10b includes a snooper 18 that provides snoop responses and performs required operations in response to transactions snooped on system bus 12. Data processing system 8 also includes at least two agents (e.g., agents 10a and 10n) including respective lowest level caches 14 for caching data associated with addresses allocated to system memory 11. In the depicted embodiment, agents 10a and 10n comprise integrated circuit processor complexes, which, in addition to a respective cache 14, each include one or more processors 16. Preferably, each processor 16 has at least one or more unillustrated level-one (L1) caches providing low latency data storage, and each cache 14 is a level-two (L2) or lower level cache.

As illustrated, each cache 14 comprises a cache directory 22 and a set associative cache array 24. As in conventional set associative caches, memory locations in system memory 12 are mapped to particular congruence classes within cache array 24 utilizing predetermined index bits within the system memory addresses. The particular cache lines stored within cache array 24 are recorded in cache directory 22, which contains one directory entry for each cache line in cache array 24. As understood by those skilled in the art, each directory entry in cache directory 22 comprises at least a tag field, which specifies the particular cache line stored in cache array 24, and a state field, which indicates the coherency state of the cache line.

Caches 14 and higher-level caches may employ any known or future-developed cache coherency protocol (e.g., the well-known MESI protocol or a variant thereof) that supports one or more shared states indicating that identical copies of a cache line may reside in more than one cache. The one or more shared cache coherency states may optionally include a shared-owner state that designates a single "owner" of a potentially shared cache line. One such state (the T cache coherency state) is disclosed in U.S. application Ser. No. 09/024,393 by Arimilli et al., which was filed Feb. 17, 1998, and is incorporated herein by reference. A second such state (the R cache coherency state) is disclosed in U.S. Pat. No. 6,018,791 to Arimilli et al., which is also incorporated herein by reference.

As shown in FIG. 1, each cache 14 further contains a master 26 and a snooper 28. Master 26 initiates transactions on system bus 12 and accesses cache array 24 and cache directory 22 in response to store and other requests received from the associated processor(s) 16. A typical transaction issued on system bus 12 by a master 26 may include a transaction field indicating the type of transaction, source and destination tags indicating the source and intended recipient(s) of the transaction, respectively, and an address and/or data.

In contrast to master 26, snooper 28 snoops transactions on system bus 12, provides appropriate snoop responses, and performs any accesses to cache directory 22 and cache array 24 required by the transactions. As discussed further below, the snoop responses provided by snoopers 28 (and snooper 18 of memory controller 10b) are received and compiled by response logic 30, which provides a combined response indicating what action, if any, each agent 10 is to take in response to the request. These actions may include sourcing data on system bus 12, storing data provided by the initiating agent 10, invalidating cached data, etc. Although illustrated separately, it should be understood that response logic 30 may alternatively be incorporated within a particular agent 10 (e.g., memory controller 10b) or be distributed among the various agents 10 such that different agents 10 (e.g., the agent initiating each transaction) compile the snoop responses to produce the combined response.

Those skilled in the art will appreciate that data processing system 8 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
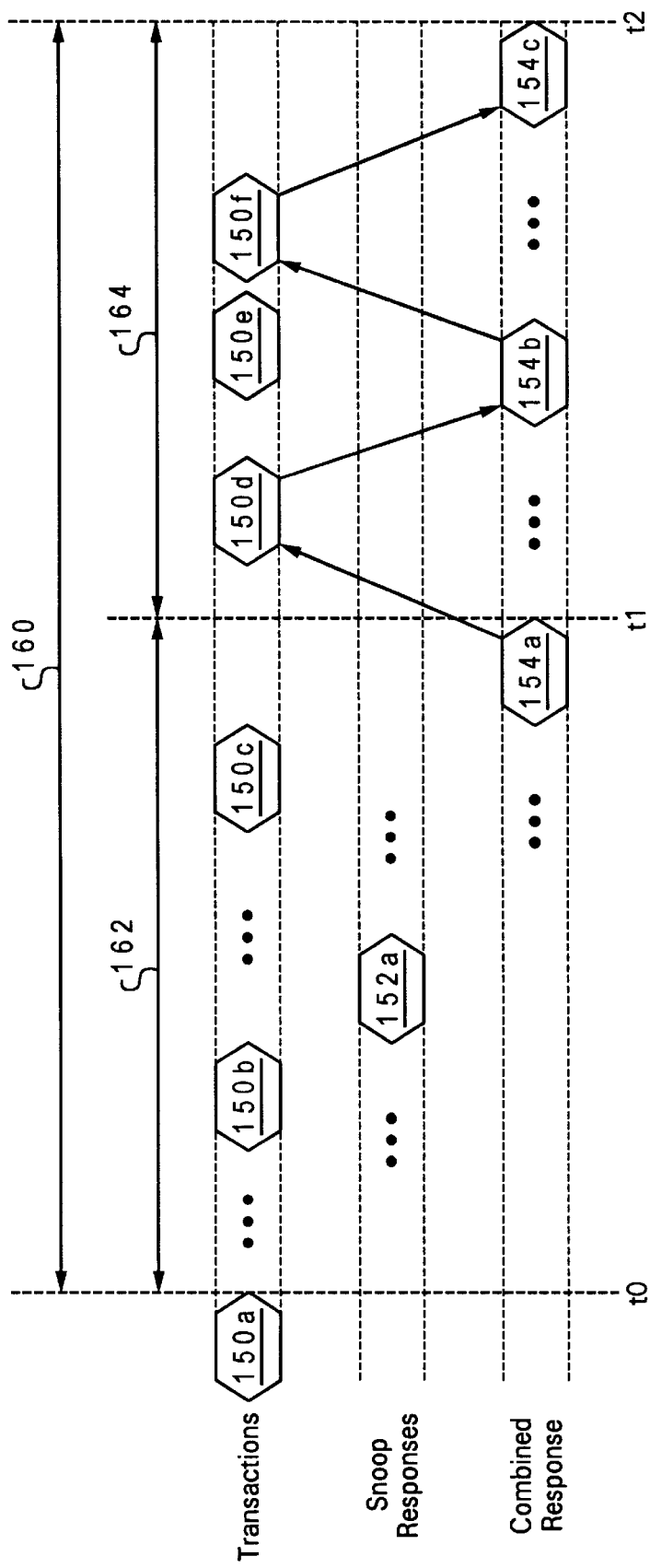
FIG. 2 is a timing diagram depicting an exemplary conflict between multiple requests to modify a shared cache line in accordance with a preferred embodiment of the present invention.

With reference now to FIG. 2, there is depicted a timing diagram that illustrates the various stages of a conflict between requests of multiple agents to modify a cache line in a shared state according to the present invention. For ease of understanding, FIG. 2 depicts operation of embodiments of data processing system 8 that employ a system bus architecture that permits all agents 10 to receive each transaction, snoop response, and combined response at substantially the same time.

As shown in FIG. 2, at time t0, master 26 of a first agent, for example, processor complex 10*a*, issues a modifying transaction 150*a* (i.e., Dclaim or RWITM) on system bus 12 that targets a cache line that is indicated as shared in the cache directory 22 of at least one agent 10. Assuming that processor complex 10*a* is ultimately granted ownership of the target cache line for purposes of modification according to the arbitration process described below, master 26 of processor complex 10*a* stores to the target cache line and completes associated clean-up operations, if any, (also discussed below) at a later time t2. The interval 160 between time t0 and t2 represents the time window in which a conflict between modifying transaction 150*a* and one or more other requests to modify the target cache line may arise. As defined herein, a conflict arises if, during interval 160, the master 26 of a second agent 10 (and possibly one or more additional agents 10) develops, or has previously developed and manifests, at any time during interval 160 an intention to modify the target cache line. This intention, which arises as a result of a store request by the processor 16 in the second agent 10 that targets a cache line marked as shared in the second agent's cache directory 22, is indicated, for example, by a Dclaim pending flag in the master 26 of the second agent.

In accordance with the present invention, arbitration for ownership of the target cache line is performed by a coherency decision point (CDP), which is defined herein as the device that grants or denies ownership of a target cache line that is held in a shared state for purposes of modification. The CDP may be implemented as a dedicated device (e.g., the snooper of a particular one of agents 10) or, more preferably, is the snooper of the agent 10 that holds the data of the target cache line in the highest state of ownership defined by the cache coherency protocol. Thus, if a target cache line is held in the cache 14 of an agent 10 in a shared-owner cache coherency state, the snooper 28 of that agent 10 preferably serves as the CDP for the target cache line. If no cache holds the target cache line in a shared-owner state, snooper 18 of memory controller 10*b* serves as the CDP.

Although other methods of arbitration are possible and fall within the scope of the present invention, in a preferred embodiment of the present invention the CDP arbitrates between multiple conflicting requests to modify the same cache line based upon which transaction is first successfully received by the CDP. Thus, as between the agents 10 that issued conflicting transactions 150*a*, 150*b*, 150*c* and 150*e* the CDP grants ownership of the target cache line to processor complex 10*a* (which issued modifying transaction 150*a*), and denies ownership to the agents 10 that issued transactions 150*b*, 150*c* and 150*e*. The CDP grants ownership of the target cache line to an agent 10 (thereby designating that agent 10 as the next CDP) and denies ownership of the target cache line to other agents 10 by providing appropriate snoop responses to the transactions during the snoop response periods (e.g., snoop response period 152*a* for transaction 150*a*) defined by the system bus protocol. A preferred implementation of the possible snoop responses are described below with reference to Table I and FIG. 4.

As noted above, for each transaction, response logic 30 combines the snoop response of the CDP with the snoop responses of the other agents 10 to produce a combined response (e.g., combined response 154*a* for modifying transaction 150*a*). In the case of the multiple conflicting requests shown in FIG. 2, the combined response informs an agent 10 that issued a transaction whether or not it "won" the arbitration performed by the CDP and is the new owner of the target cache line (and also the new CDP in the preferred embodiment). A preferred implementation of the possible combined responses is described below in detail with respect to Tables II and III and FIGS. 3A and 3B.

Because coherency protocols typically require that only a single agent can own each cache line at any given time for purposes of modification, it is imperative that the ownership of the target cache line by processor complex 10*a* (i.e., the new owner) be protected against other conflicting transactions during interval 160. Ideally, processor complex 10*a* would "know" immediately after issuing modifying transaction 150*a* that it will be awarded ownership and would be able to protect its ownership by providing snoop responses denying ownership to the agents 10 that issued conflicting transactions 150*b*, 150*c* and 150*e*. However, because of the finite interval 162 between the time t0 at which processor complex 10*a* issues modifying transaction 150*a* and time t1 at which processor complex 10*a* is informed of the grant of ownership by combined response 154*a*, ownership of the target cache line by processor complex 10*a* is protected by the granting CDP during interval 162. As noted above, the granting CDP protects the ownership of target cache line by providing snoop responses denying ownership to other agents 10 that issue conflicting transactions. Following interval 162, that is, during interval 164 between receipt of combined response 154*a* and the close of interval 160, processor complex 10*a* can protect its ownership of the target cache line by providing appropriate snoop responses.

Figure 3A:
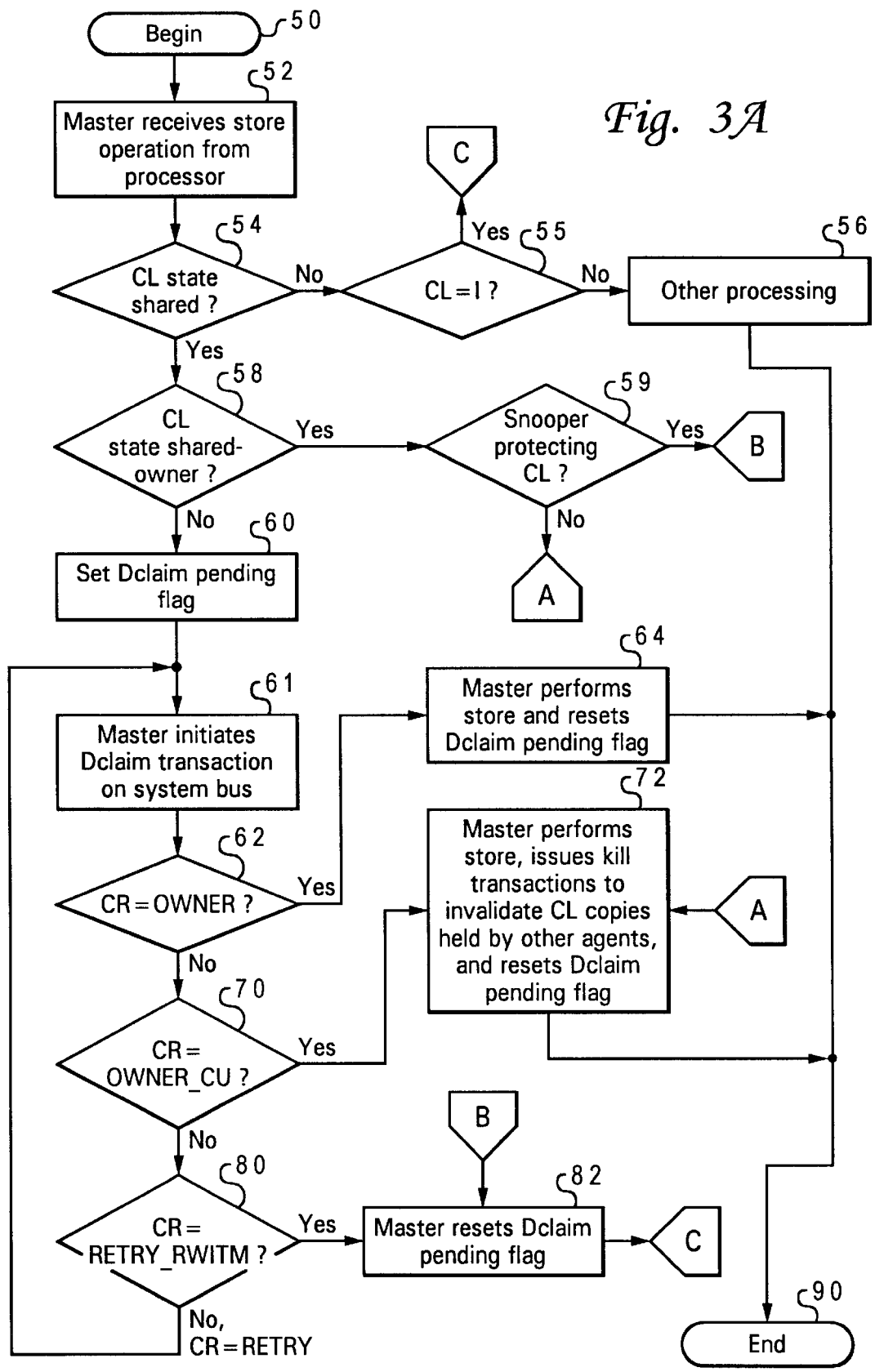
FIGS. 3A and 3B together form a high-level logical flowchart of a method of processing by a master in the data processing system of FIG. 1.
Figure 3B:
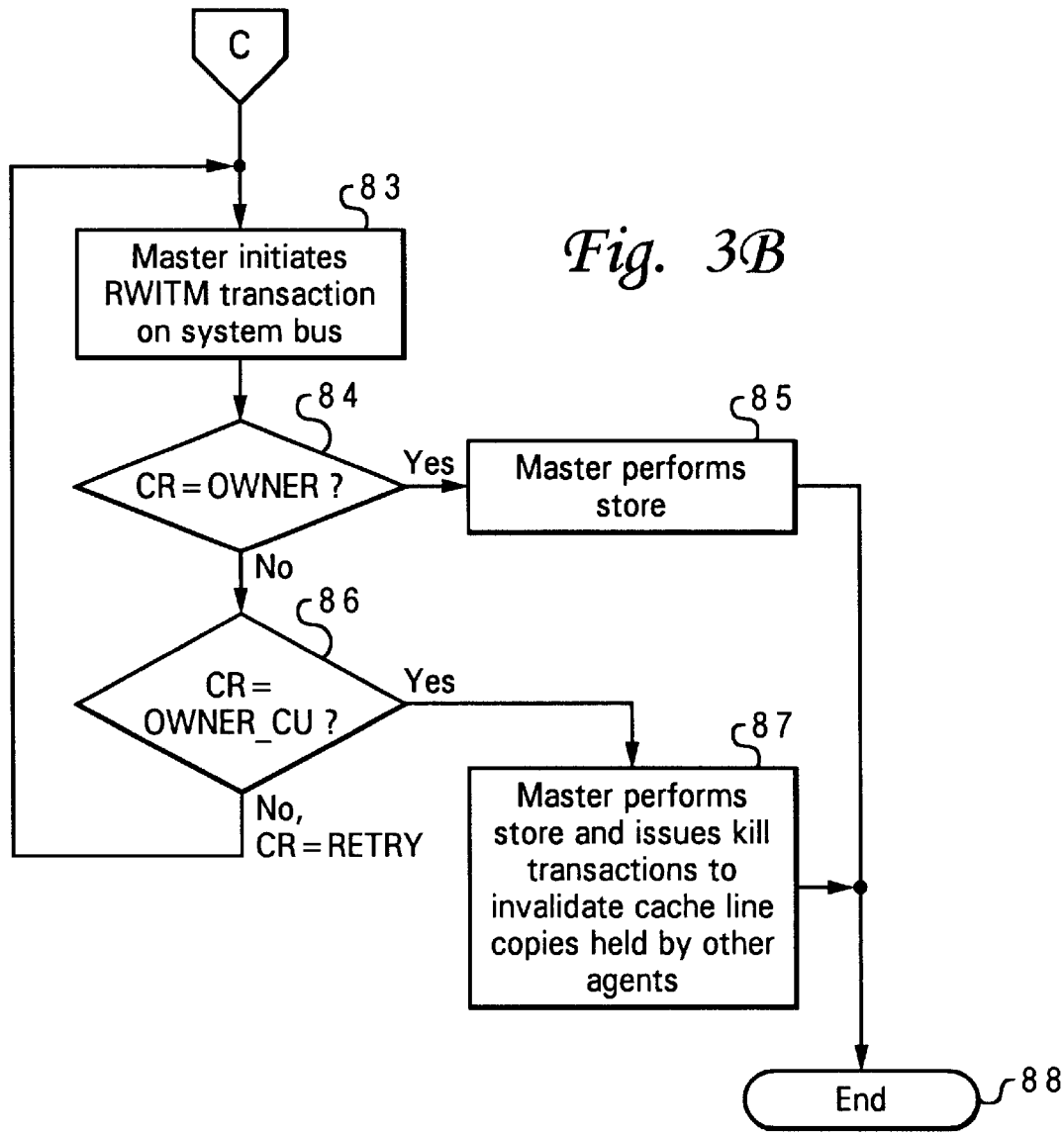
Figure 4:
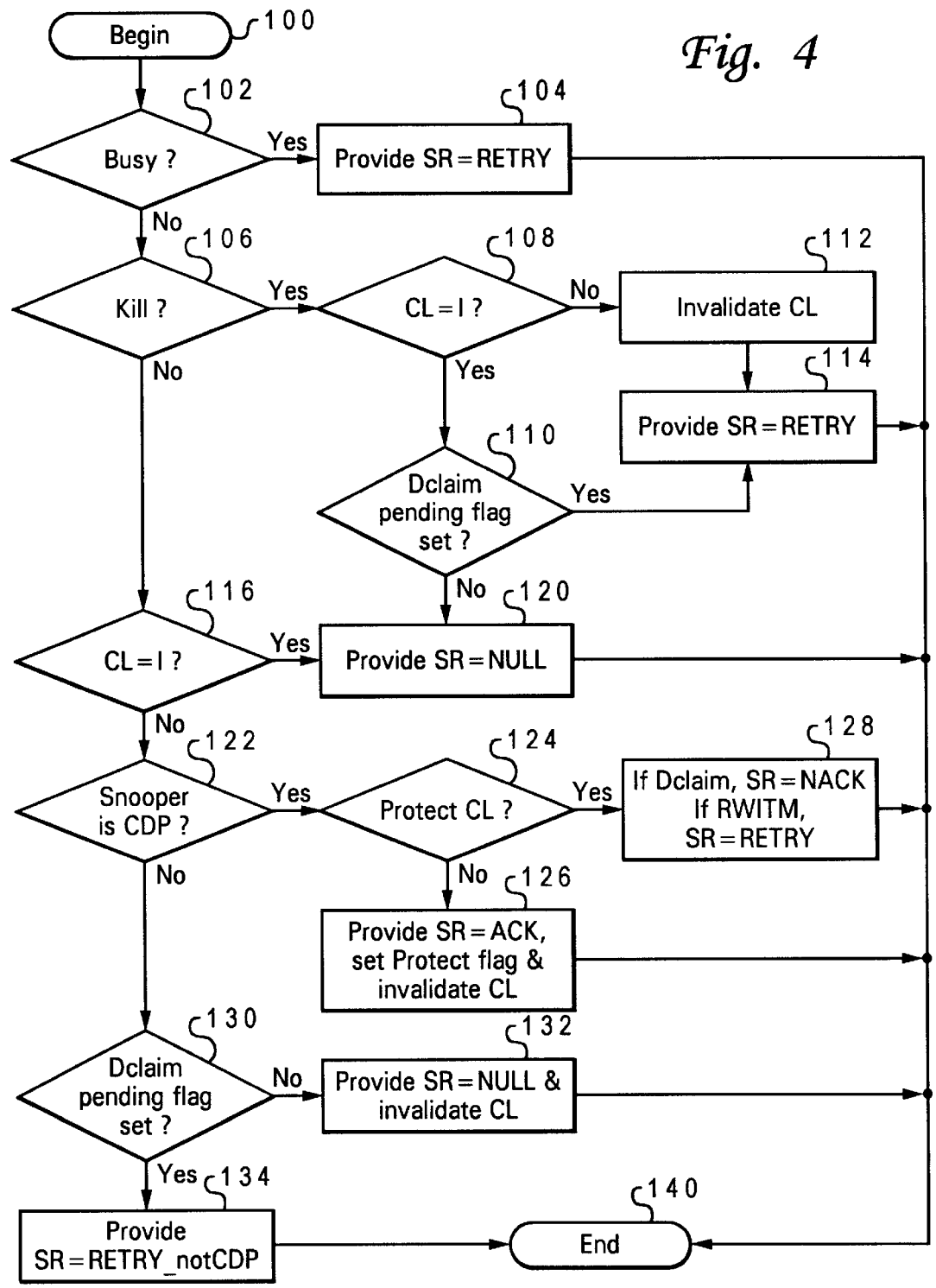
FIG. 4 is a high-level logical flowchart of a method of processing by a snooper in the data processing system of FIG. 1.

Referring now to FIGS. 3A, 3B and 4, there are depicted high-level logical flowcharts of the operations of a master 26 and a snooper 28 of a transaction on system bus 12 in accordance with a preferred embodiment of the present invention. Together, FIGS. 3A, 3B and 4 depict how conflicts between requests of multiple agents to modify a cache line in a shared state are arbitrated by the CDP and how ownership of the cache line granted by the CDP is protected.

With reference first to FIG. 3A, processing in the master 26 (e.g., of processor complex 10*a*) begins at block 50 and thereafter proceeds to block 52. As illustrated, block 52 represents master 26 receiving a store request (including request address) from processor 16. Master 26 handles the store request according to the coherency state associated with the request address in cache directory 22, as shown at blocks 54, 55 and 58. In particular, if cache directory 22 indicates that the target cache line is in a shared state (defined herein as any state indicating that identical data may be held in another cache 14), the process passes from block 54 to block 58. If, however, cache directory 22 indicates the target cache line identified by the request address is invalid, the process passes from block 54 through block 55 and page connector C to block 83 of FIG. 3B, which illustrates master 26 issuing a RWITM transaction on system bus 12 to obtain a copy of the cache line from another agent 10 for modification.

Returning to block 55 of FIG. 3A, if the cache line has a coherency state other than shared or invalid, other processing is performed, as shown at block 56. For example, if the coherency state associated with the target cache line is an exclusive state (e.g., the Modified (M) state or Exclusive (E) state of the MESI protocol), master 26 simply performs the store into cache array 24 without issuing a transaction on system bus 12 and, if appropriate, updates cache directory 22. In addition, master 26 prevents access to the target cache line by other agents 10 by means of appropriate snoop responses until the store into cache array 24 is completed. Following block 56, processing terminates at block 90.

If master 26 determines that cache directory 22 indicates that the target cache line specified in the store request is held by cache 14 in a shared state, servicing the store request may not require a Dclaim or RWITM transaction on system bus 12, depending upon the precise cache coherency state and the state of the associated snooper 28. As shown at blocks 58 and 60, if master 26 determines from cache directory 22 that the target cache line is not in a shared-owner state, master 26 sets its Dclaim pending flag and initiates a Dclaim transaction on system bus 12 to obtain ownership of the target cache line from the CDP. As defined herein, the Dclaim transaction (which may have a different name or transaction subtype in various bus protocols) is any transaction that indicates to other agents that a master intends to modify a shared cache line held in its associated cache and that the other agents should invalidate their cached copies of the cache line, if any. As noted above, each agent 10 that receives the Dclaim transaction provides a snoop response to the Dclaim transaction, and response logic 30 combines these snoop responses to produce a combined response that indicates if, and under what conditions, master 26 can perform the store operation. The various possible combined responses to a Dclaim transaction are discussed below with reference to blocks 62, 70 and 80 following a discussion of the snoop responses with reference to FIG. 4.

Returning to blocks 58 and 59 of FIG. 3A, if the state of the target cache line recorded in cache directory 22 is a shared-owner state (meaning that the associated snooper 28 is the CDP) and master 26 determines through communication with snooper 28 that snooper 28 is not protecting ownership of the target cache line on behalf of another agent 10 to which snooper 28 has granted ownership (as described further below), then master 26 can perform the requested store without issuing a Dclaim or RWITM transaction on system bus 12. Accordingly, the process shown in FIG. 3A proceeds through page connector A to block 72, which illustrates master 26 performing the store into its cache array 24. In addition, to maintain coherency, master 26 performs clean-up operations to invalidate other (now stale) copies of the target cache line, if any, held by other agents 10, and further, to ensure that the associated snooper 28 provides snoop responses informing masters 26, if any, that lost the arbitration to downgrade their Dclaim transactions to RWITM transactions. Master 26 invalidates other copies of the target cache line by issuing high-priority Kill transactions on system bus 12 until all other agents provide Null snoop responses indicating that other copies of the cache line have been invalidated, as discussed further below. While master 26 is issuing these Kill transactions, the associated snooper 28 provides NACK snoop responses (described below) to Dclaim transactions of losing masters 26 that did not receive an NACK snoop response during interval 162.

Referring again to block 59, if master 26 determines through communication with snooper 28 that snooper 28 is protecting ownership of the target cache line on behalf of another agent 10 to which snooper 28 has previously granted ownership, then master 26 must gain ownership of the modified cache line from the new owner by issuing a RWITM transaction on system bus 12. Accordingly, the process of FIG. 3A passes from block 59 through page connector B to block 82, which illustrates master 26 resetting its Dclaim pending flag, and then passes through page connector C to block 83 of FIG. 3B, which illustrates master 26 issuing a RWITM transaction on the system bus 12.

Referring now to FIG. 4, a preferred embodiment of a method by which a snooper 28 determines the appropriate snoop responses for Dclaim, RWITM and Kill transactions received via system bus 12 is depicted in a high-level logical flowchart. As defined in Table I below, there are preferably at least four classes of snoop responses (SRs) that an agent 10 can assert in response to snooping Dclaim, Kill and RWITM transactions.

TABLE I

| Snoop response (SR) | Definition | Transaction for which SR is appropriate |
|---|---|---|
| ACK | Agent is the coherency decision point (CDP) for determining ownership of the target cache line and grants ownership of target cache line to initiator agent for purposes of modification | Dclaim RWITM |
| NACK | Agent is the coherency decision point (CDP) for determining ownership of the target cache line and denies ownership of target cache line to initiator agent for purposes of modification due to a previous grant of ownership | Dclaim |
| RETRY | Agent cannot process transaction or cannot allow operation to proceed | Dclaim RWITM Kill |
| RETRY_notCDP | Agent has a pending store request that conflicts with the snooped transaction and agent is not the CDP | Dclaim RWITM |
| NULL | None of the other SRs is asserted | Dclaim RWITM Kill |

The process shown in FIG. 4 begins at block 100 in response to a snooper 28 snooping a transaction on system bus 12. If snooper 28 determines at block 102 that it cannot process the transaction (e.g., because snooper 28 is busy or detected a parity error in the transaction or cache directory 22, etc.), snooper 28 issues a RETRY SR to the received transaction (block 104). Thereafter, the process terminates at block 140.

If, however, snooper 28 of the recipient agent 10 can process the received transaction, snooper access cache directory 22 utilizing the transaction address, examines the transaction type of the snooped transaction, and determines whether the Dclaim pending flag of the associated master is set for the transaction address. If the snooped transaction is a Kill (block 106) and cache directory 22 indicates that cache array 24 does not hold data corresponding to the transaction address (i.e., the cache coherency state is invalid (I)) (block 108), and the Dclaim pending flag of the associated master 26 is not set (block 110), then snooper 28 belongs to an agent 10 that either (1) did not have a conflicting modifying store request or (2) lost arbitration for the target cache line and has already both downgraded to a RWITM transaction and invalidated its copy of the target cache line. Accordingly, the process passes to block 120, which depicts snooper 28 providing a NULL SR to the Kill transaction. As explained above, a NULL SR, which indicates that snooper 28 has no interest in the transaction, can be provided simply by failing to assert any of the other SRs. Following block 120, the process shown in FIG. 4 terminates at block 140.

Returning to blocks 108 and 110, if snooper 28 determines that the target cache line is invalid in cache directory 22 and that the Dclaim pending flag of the associated master 26 is set, snooper 28 belongs to an agent 10 whose master 26 lost arbitration for ownership of the target cache lineand has not yet received a combined response indicating such, but has completed the invalidation of its cache line. Snooper 28 therefore provides a RETRY SR as depicted at block 114. The RETRY SR results in a RETRY CR to the Kill transaction, which requires the master 26 that won the arbitration to issue another Kill transaction to ensure that the losing master 26 has downgraded to a RWITM transaction (as evidenced by a reset Dclaim pending flag).

Referring again to block 108, if snooper 28 determines that the target cache line is not invalid in cache directory 22, the process passes from block 108 to block 112, which illustrates snooper 28 beginning the process of updating cache directory 22 to invalidate the local copy of the target cache line. As indicated at block 114, snooper 28 also provides a RETRY SR to indicate that the cache line invalidation process is not complete and that the master 26 issuing the Kill transaction must issue at least one additional Kill transaction to ensure the target cache line invalidation has completed. The process thereafter terminates at block 140.

Returning to block 106, in response to snooper 28 determining that the snooped transaction is not a Kill (but is instead a Dclaim or RWITM), the process shown in FIG. 4 passes to block 116. If the transaction is not a Kill transaction and the coherency state of the target cache line is invalid, then the process proceeds to block 120, and snooper 28 provides a NULL SR to the snooped transaction. The process thereafter terminates at block 140.

If, however, snooper 28 determines in response to snooping a Dclaim or RWITM transaction that the coherency state is other than invalid, the process proceeds from block 116 to block 122. Block 122 is a decision block representing the fact that snooper 28 provides differing SRs for the snooped transaction, depending upon whether snooper 28 is currently the CDP for the target cache line (i.e., either the granting CDP or the newly designated CDP). As explained above, snooper 28 can be either be a CDP by virtue of the target cache line being set to a shared-owner state in cache directory 22 or because the associated master 26 has been granted ownership of target cache line by the previous CDP.

If snooper 28 is the CDP for the target cache line, the process passes to block 124, which depicts a determination by snooper 28 whether to protect ownership of the target cache line, either for its associated master 26 or for the master of another agent 10. Snooper 28 can determine whether to protect ownership of the target cache line for the master 26 of another agent 10 by checking the state of a Protect flag indicating whether the snooper 28 has previously provided an ACK SR to an earlier Dclaim transaction that specified the target cache line and that has not yet received a combined response. If the Protect flag is set, snooper 28 must protect the previous grant of ownership of the target cache line for the duration of interval 162, which concludes when the combined response for the "winning" transaction is received. When the combined response for the winning transaction is received, snooper 28 resets the Protect flag.

Snooper 28 can also determine at block 124 whether to protect ownership of the target cache line for the associated master 26 by communication to determine whether the associated master 26 is a newly designated CDP working on storing to the target cache line. If so, the associated master 26 necessarily won arbitration for ownership of the target cache line (as indicated by the combined response), and the snooper 28 must protect ownership of the cache line for the associated master 26 during interval 164.

If snooper 28 determines at block 124 that it does not need to protect ownership of the target cache line, then snooper 28 grants the master 26 that sourced the snooped transaction ownership of the target cache line by providing an ACK SR and ensures subsequent protection of the grant of ownership by setting the Protect flag. (This grant of ownership ultimately transfers the responsibility of serving as the CDP for the target cache line to the associated snooper 28.) In addition, snooper 28 invalidates the locally cached copy of the target cache line. Following block 126, the process terminates at block 140.

If snooper 28 determines at block 124 that it is required to protect ownership of the cache line, snooper 28 provides a NACK SR if the snooped transaction is a Dclaim and a RETRY SR if the snooped transaction is a RWITM, as shown at block 128. In either case, the NACK or RWITM SR denies ownership to the master 26 of the snooped transaction (and protects the previously granted ownership of the target cache line) by forcing the master 26 that issued the snooped transaction to issue a RWITM transaction to attempt to gain ownership of the newly modified cache line from the new owner. Following block 128, the process terminates at block 140.

Returning to block 122, if snooper 28 determines that it is not the CDP for the target cache line, the process proceeds to block 130. Block 130 depicts snooper 28 determining whether the associated master 26 has a pending conflicting modifying request, as indicated, by master 26 having a set Dclaim pending flag. If not, snooper 28 provides a NULL SR and invalidates the locally cached copy of the target cache (block 132). The process then terminates at block 140.

However, in response to a determination by snooper 28 at block 130 that the associated master 26 has a pending conflicting modifying request, snooper 28 provides a RETRY_notCDP SR to signify that the agent 10 has a pending conflicting modifying request and believes it may ultimately be granted ownership of the target cache line. As such, if the master 26 of the snooped transaction is ultimately awarded ownership of the target cache line by the CDP, the master 26 must perform cleanup operations prior to completing the modifying operation in order to ensure that the snooper(s) 28 that provided RETRY_notCDP SR(s) do(es) not violate coherency. These cleanup operations are discussed below with reference to block 72 of FIG. 3A and block 87 of FIG. 3B. Following block 134, the process illustrated in FIG. 4 terminates at block 140.

As noted above, response logic 30 compiles the snoop responses to each transaction placed on system bus 12 to produce a combined response (CR). Table II, below, summarizes the CRs provided by response logic 30 for RWITM and Dclaim transactions in response to various combinations of SRs in accordance with a preferred embodiment of the present invention. In Table II, "X" represents a "don't care," and a "-" indicates that the SR heading that column was not asserted by any snooper 28. The possible CRs listed in Table II are defined in Table III, below.

TABLE II

| RETRY | ACK/NACK | RETRY_notCDP | CR |
|---|---|---|---|
| — | — | X | RETRY (error) |
| X | NACK | X | RETRY_RWITM for Dclaim RETRY for RWITM |
| — | ACK | — | OWNER |
| — | ACK | RETRY_notCDP | OWNER_CU |
| RETRY | — | X | RETRY |
| RETRY | ACK | X | OWNER_CU |

TABLE III

| Combined response (CR) | Definition |
|---|---|
| OWNER | Master is awarded ownership of CL by CDP for purposes of modifying CL |
| OWNER_CU | Master is awarded ownership of CL by CDP for purposes of modifying CL, but must perform clean-up operations to maintain coherency |
| RETRY_RWITM | Master must cease issuing Dclaim transactions and issue a RWITM transaction to attempt to gain ownership of an updated copy of the CL |
| RETRY | Master must reissue the transaction to attempt to gain ownership of the CL |

As indicated in Table II, if a Dclaim or RWITM transaction does not receive one of the RETRY, ACK or NACK SRs, an error has occurred in that the CDP, which is in charge of determining a next owner of the cache line, has failed to respond to the transaction. Accordingly, response logic 30 signifies that an error has occurred by asserting a RETRY CR, meaning that the master 26 must reissue the modifying operation (additional error correction may also be necessary). Response logic 30 similarly returns a RETRY CR if no ACK SR or NACK SR is received from the CDP and a RETRY SR is received because response logic 30 can determine from these SRs that the CDP may have been prevented responding with an ACK or NACK SR to the modifying transaction due to an internal error (see block 102 of FIG. 4). As shown in FIG. 3A by negative determinations at blocks 62, 70 and 80 for a Dclaim transaction (and similarly at blocks 84 and 86 of FIG. 3B for RWITM transactions), if a master 26 receives a RETRY CR the master 26 reissues the transaction on system bus 12, as shown at block 61 of FIG. 3A and block 83 of FIG. 3B.

As shown in Table II, if a CDP responds to a Dclaim transaction with an NACK SR, thereby denying ownership of the cache line to the master 26 because another agent 10 has previously been granted ownership of the cache line, response logic 30 provides a RETRY_RWITM CR. The RETRY_RWITM CR signifies to the initiator agent 10 that its locally cached copy of the cache line, if any, has been or will be invalidated and that the master 26 must issue a RWITM transaction on system bus 12 to gain ownership of an updated copy of the cache line from the agent 10 that is the new owner. As shown in FIG. 3A at blocks 80 and 82, in response to a RETRY_RWITM CR, master 26 downgrades its pending Dclaim transaction to a RWITM transaction, and will subsequently issue a RWITM transaction on system bus 12 to gain ownership of the target cache line.

In accordance with an important aspect of the present invention and as shown in rows 3, 4 and 6 of Table II, if the CDP responds to a Dclaim or RWITM transaction with an ACK SR, response logic 30 provides either an OWNER or OWNER_CU CR, depending upon the SRs of the other agents 10. In either case, master 26 is notified by the CR that the CDP has awarded master 26 ownership of the cache line for purposes of modification. However, the obligations of the master 26 as the new owner differ, depending on whether an OWNER or OWNER_CU CR was received. As shown at blocks 62–64 of FIG. 3A and at blocks 84 and 85 of FIG. 3B, if master 26 receives an OWNER CR in response to its Dclaim or RWITM transaction, master 26 can perform the store without violating coherency because all of the agents 10 caching the same cache line, if any, have invalidated or will invalidate their respective copies of the cache line and no master 26 has an intention to modify a locally cached shared copy of the target cache line. Following block 85, the process shown in FIG. 3B terminates at block 88. If the transaction was a Dclaim, master 26 also resets its Dclaim pending flag, as depicted in block 64 of FIG. 3A.

If, on the other hand, master 26 receives an OWNER_CU CR from response logic 30, master 26 can still proceed with the operation without reissuing its Dclaim or RWITM transaction, despite the presence of a RETRY or RETRY_notCDP SR. However, as shown at block 72 of FIG. 3A and block 87 of FIG. 3B, because at least one other agent 10 was not able to process the original transaction or had a pending conflicting modifying request, master 26 must perform clean-up operations to ensure coherency. In a preferred embodiment, the clean-up operations entail issuing high-priority Kill transactions on system bus 12 until all other cached copies of the target cache line held by other agents 10 are invalidated and no other agent has an intention to modify a locally cached shared copy of the target cache line. As shown at blocks 106, 108 and 112 of FIG. 4, the Kill transactions are of sufficiently high priority that agents 10 that snoop a Kill transaction (and are able to process it) invalidate the target cache line in cache directory 22 even if the agent 10 has a pending conflicting modifying request. As indicated at block 72 of FIG. 3A, if the transaction was a Dclaim, master 26 also resets its Dclaim pending flag.

Referring again to FIG. 2, the process of issuing Kill transactions as a part of the clean-up operation performed during interval 164 is illustrated. As shown, assuming CR 154a is OWNER_CU, the master of modifying transaction 150a issues a first Kill transaction 150d on system bus 12. Assuming first Kill transaction 150d receives at least one RETRY SR because at least one cached copy of the target cache line has not yet been invalidated or because at least one master's Dclaim pending flag is still set, response logic 30 provides RETRY CR 154b for first Kill transaction 150d. Consequently, the master 26 of modifying transaction 150a issues a second Kill transaction 150f on system bus 12. Assuming no snooper 28 provides a RETRY SR to second Kill transaction 150f, response logic 30 provides a NULL CR 154c, closing interval 160 and permitting the master 26 of modifying transaction 150a to discontinue protection of the target cache line (assuming master 26 has also completed retirement of the store into cache array 24.

As has been described, the present invention provides an improved data processing system and method for arbitrating between conflicting requests to modify a cache line held in a shared state and for protecting ownership of the cache line granted during such arbitration. In accordance with the present invention, a coherency decision point in the data processing system grants ownership of the cache line to a selected agent, for example, based upon which agent's transaction is first received. The coherency decision point grants ownership to the selected agent and protects the grant of ownership against conflicting transactions of other agents by providing appropriate snoop responses. An agent other than the coherency decision point that has a pending conflicting modifying request provides a snoop response to a snooped conflicting transaction that indicates that, should the other agent be granted ownership of the target cache line by the coherency decision point, the other agent must perform clean-up operations to maintain coherency.

The snoop responses are combined to produce a combined response, which informs the initiating master of the selected transaction that it has been granted ownership by the coherency decision point and whether clean-up operations are required. The clean-up operations include issuing one or more Kill transactions on the system bus to invalidate other cached copies of the target cache line and providing appropriate snoop responses so that no other agent maintains an intention to modify a locally cached shared copy of the target cache line.

During the process of transferring ownership of the target cache line to the master selected by the coherency decision point, the target cache line is protected by the coherency decision point from modification by other agents until the initiator agent receives the combined response. Following receipt of the combined response by the initiator agent, the initiator agent preferably protects ownership of the cache line until the store operation is complete, other cached copies of the line, if any, are invalidated, and no other agent has an intention to modify a locally cached shared copy of the target cache line.

While the invention has been particularly shown and described with reference to a preferred embodiment, it will be understood by those skilled in the art that various changes in form and detail may be made therein without departing from the spirit and scope of the invention.

What is claimed is:

1. A method of operating a data processing system including a plurality of agents coupled by an interconnect, said method comprising:
   while data associated with a target address is cached at a first agent among the plurality of agents in a shared state, the first agent issuing on the interconnect a transaction requesting to modify said data;
   in response to snooping said transaction, a second agent providing a first snoop response indicating that the second agent has a pending conflicting modifying request and a coherency decision point providing a second snoop response granting the first agent ownership of the data;
   processing the first and second snoop responses and any other snoop response of the plurality of agents to obtain a combined response that grants the first agent ownership of the data so that said first agent can modify the data without regard to whether any other agent caches valid data associated with the target address; and
   providing the combined response to the first agent independently of invalidation of any cached copy of said data held by any other of said plurality of agents.

2. The method of claim 1, and further comprising in response to the combined response, modifying the data at the first agent without reissuing the transaction.

3. The method of claim 1, wherein the transaction comprises a first transaction, and wherein providing the snoop response from the coherency decision point comprises providing the snoop response in response to receiving the first transaction at the coherency decision point prior to the coherency decision point receiving a conflicting second transaction from the second agent.

4. The method of claim 1, and further comprising receiving the transaction at the coherency decision point, wherein the coherency decision point comprises an agent among said plurality of agents that has ownership of the data under a coherency protocol and holds a copy of the data.

5. The method of claim 4, wherein the coherency decision point comprises a memory controller for a system memory assigned the target address, and wherein receiving the transaction at the coherency decision point comprises receiving the transaction at the memory controller.

6. The method of claim 4, wherein the coherency decision point is an caching agent among the plurality of agents that caches data associated with the target address, and wherein receiving the transaction at the coherency decision point comprises receiving the transaction at the caching agent.

7. The method of claim 1, and further comprising:
   in response to receipt of a conflicting second transaction from the second agent at the coherency decision point, providing a snoop response by the coherency decision point to the second transaction indicating denial of ownership of the data to the second agent.

8. The method of claim 7, wherein said second transaction is a Dclaim transaction, said method further comprising:
   in response to receipt of a combined response to said Dclaim transaction, issuing a read-type transaction by said second agent on said interconnect to obtain said target cache line from said first agent.

9. The method of claim 1, and further comprising:
   said first agent modifying said data associated with said target address in response to receipt of said combined response, said first agent performing said modifying prior to invalidation of a copy of said data by at least one other of said plurality of agents; and
   said first agent maintaining coherency by issuing on the interconnect one or more kill transactions specifying said target address to invalidate said cached copy of said data.

10. The method of claim 1, and further comprising said first agent protecting ownership of said data following receipt of said combined response by providing a snoop response to at least one conflicting transaction.

11. A method of operating a data processing system including a plurality of agents coupled by an interconnect said method comprising:
   at a first agent among said plurality of agents, storing data in a cache in a shared state;
   while said first agent caches said data in the shared state, the first agent modifying said data in the cache without requesting said data from any other of the plurality of agents, said first agent modifying said data prior to invalidation of a concurrently held copy of said data stored by at least one other of said plurality of agents; and
   after said modifying, the first agent issuing at least one kill transaction on the interconnect to invalidate said copy of the data cached by said at least one other of said plurality of agents.

12. A data processing system, comprising:

an interconnect;

a first agent of a plurality of agents coupled to the interconnect, said first agent having an associated cache that holds data associated with a target address in a shared state, said first agent including a master that issues on the interconnect a transaction requesting to modify said data;

a second agent coupled to the interconnect, said second agent including a snooper that, responsive to snooping said transaction, provides a first snoop response indicating that the second agent has a pending conflicting modifying request;

a coherency decision point coupled to the interconnect that provides a second snoop response granting the first agent ownership of the data; and response logic coupled to the interconnect, wherein, responsive to said first and second snoop responses, said response logic processes the first and second snoop responses and any other snoop response to the transaction of the first agent of the plurality of agents to obtain a combined response that grants the first agent ownership of the data so that said first agent can modify the data without regard to whether any other agent caches valid data associated with the target address and provides the first agent with the combined response independently of invalidation of any cached copy of said data held by any other of said plurality of agents.

13. The data processing system of claim 12, wherein said first agent, in response to receiving the combined response, modifies the data without reissuing the transaction.

14. The data processing system of claim 12, wherein the transaction comprises a first transaction, and wherein the coherency decision point provides the snoop response granting ownership of the data to the first agent in response to receiving the first transaction at the coherency decision point prior to the coherency decision point receiving a conflicting second transaction from the second agent.

15. The data processing system of claim 12, wherein the coherency decision point comprises an agent among said plurality of agents that has ownership of the data under a coherency protocol and holds a copy of the data.

16. The data processing system of claim 15, wherein the coherency decision point comprises a memory controller for a system memory assigned the target address.

17. The data processing system of claim 15, wherein the coherency decision point is an caching agent among the plurality of agents that caches data associated with the target address.

18. The data processing system of claim 12, wherein said coherency decision point responsive to receipt of a conflicting second transaction from the second agent at the coherency decision point, provides a snoop response to the second transaction indicating denial of ownership of the data to the second agent.

19. The data processing system of claim 18, wherein said second transaction is a Dclaim transaction, and wherein said second agent, in response to receipt of a combined response to said Dclaim transaction, issues a read-type transaction on said interconnect to obtain said data from said first agent.

20. The data processing system of claim 12, wherein:

said first agent modifies said data associated with said target address in response to receipt of said combined response, wherein said first agent performs said modification prior to invalidation of a copy of said data by at least one other of said plurality of agents; and said first agent maintains coherency by issuing on the interconnect one or more kill transactions specifying said target address to invalidate said cached copy of said data.

21. The data processing system of claim 12, wherein said first agent protects ownership of said data following receipt of said combined response by providing a snoop response to at least one conflicting transaction.

22. A data processing system, comprising:

an interconnect;

a plurality of agents coupled to said interconnect, said plurality of agents including a first agent that, while caching said data in a cache in a shared state, modifies said data in the cache without requesting said data from any other of the plurality of agents and prior to invalidation of a concurrently held copy of said data by at least one other of said plurality of agents, wherein said first agent, after modifying said data, issues at least one kill transaction on the interconnect to invalidate said copy of the data cached by said at least one other of said plurality of agents.

* * * * *